Nov. 11, 1930.  A. DAVIS, JR  1,781,369

HYDRAULICALLY OPERATED TANK VALVE

Filed Jan. 3, 1929

INVENTOR
Augustine Davis Jr.
By J. Shoenberg
ATTORNEY

Patented Nov. 11, 1930

1,781,369

REISSUED

UNITED STATES PATENT OFFICE

AUGUSTINE DAVIS, JR., OF CINCINNATI, OHIO

HYDRAULICALLY-OPERATED TANK VALVE

Application filed January 3, 1929. Serial No. 330,125.

The invention relates to tank outlet valves in which a normally closed valve member is opened by means of a hydraulic device of the metal bellows type. A drawback of such devices is the fact that quantity of air is likely to be trapped in the top of the device, which reduces the efficiency and promptness of the operation since the air is compressible. It is the custom of the company manufacturing the device to manipulate it carefully by turning it over and repeatedly injecting the operating liquid until the air is all driven out, after which the device is sealed and sent to the customer full of liquid. The user is then presented with a difficulty in connecting the device with the pipe line and control apparatus without letting any of the liquid escape, while keeping the pipe line and its connected apparatus full, so that air shall not be present therein.

These difficulties are overcome in the present invention by the provision of means for conducting air from the top of the liquid-receiving space of the device, so that the air may be expelled by liquid admitted after the device has been connected up for use, after which the exit of the vent is closed. With this provision it is unnecessary for the manufacturer of the device to fill and seal it, and the device can be connected to a pipe line while both are empty.

The particular object of the invention is to provide means for evacuating air from the bellows servo-motor of a tank valve externally of the tank, said means affording an indication when all air has been expelled from the device and the latter filled with operating liquid, the vent being then closed by means applied or operated outside of the tank. A further object is to apply the vent in such manner that the entire bellows device is readily removable from and applicable to an external outlet body.

Figure 1:
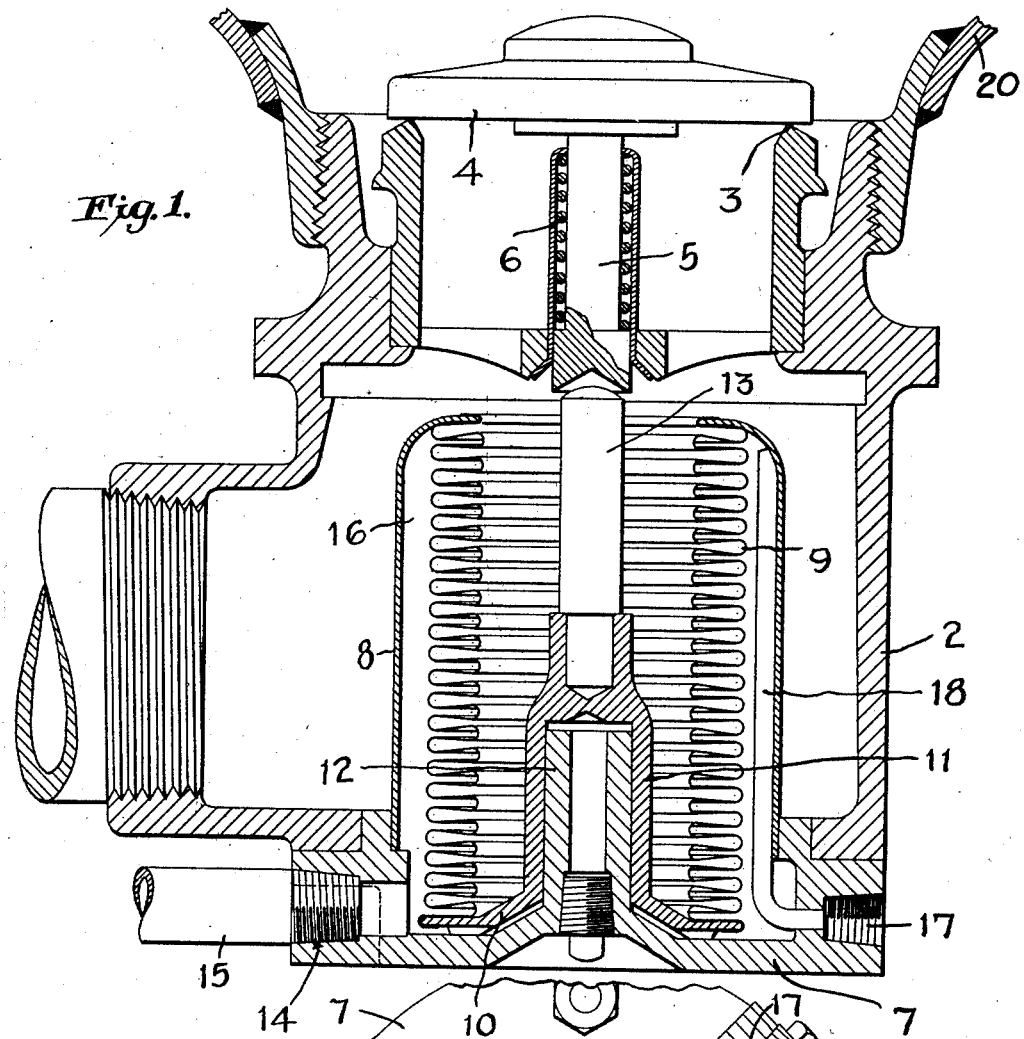
Figure 2:
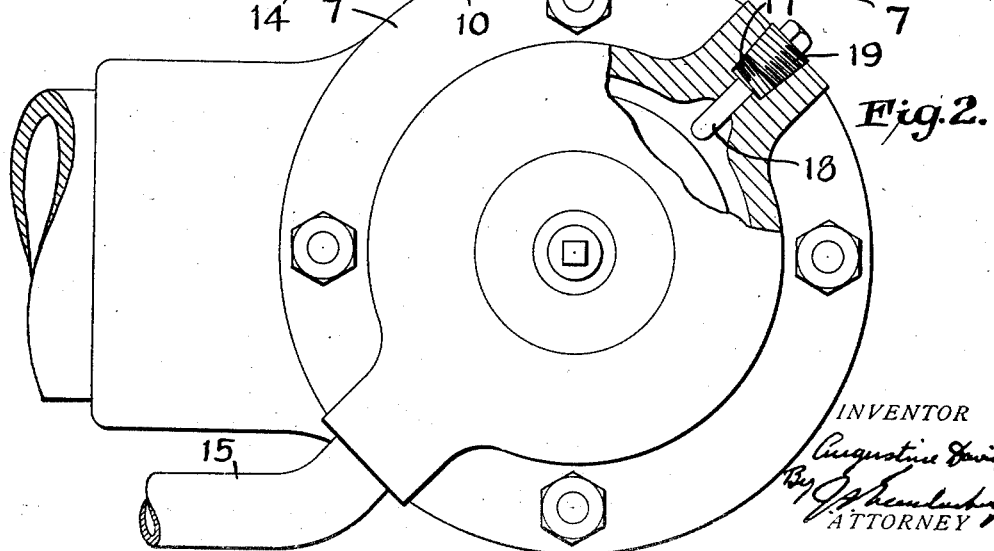

In the accompanying drawing forming part hereof:

Fig. 1 is a vertical sectional view of a tank valve embodying the invention; and Fig. 2 is a bottom plan view, partly broken out and in section, showing the exit of the vent tube closed.

The numeral 2 designates an external outlet and valve body having a valve seat 3 in its upper portion. A valve member 4 having a depending stem 5 is seated by a spring 6. The valve body is secured in the bottom outlet of a tank, a portion 20 of which is shown.

The bellows device in the lower part of the valve body is mounted on a removable base-plate 7, forming the bottom wall of the body. A cylinder 8 is fixed at its lower end to this base-plate, and to its upper end is tightly connected the upper end of a tubular metal bellows 9. The lower end of this bellows is tightly secured to a movable head 10, having a socket portion 11 which is guided on a post 12 rising from the base plate. A rod 13 secured to the socket portion 11 extends upward to act upon the valve stem 5.

The base-plate 7 has a screw-threaded opening 14, to which is connected the pipe 15 for admitting liquid pressure medium to the space 16 between the bellows and the cylinder and beneath the movable head. Normally the liquid is allowed to escape through this same opening and pipe, when the control means (not shown) connected with the pipe is operated to release the pressure and allow the bellows to collapse.

The base-plate is provided with another screwthreaded opening 17, and from this opening a vent tube 18 extends upward practically to the top of the space 16, where its upper or inlet end is open.

After the device has been installed and connected up, operating liquid is introduced through the line 15 until all the air inside the device has been displaced by liquid. When liquid flows out of the exit 17 of the vent, it will be evident that the device is substantially full of liquid. The opening 17 is then closed permanently or semi-permanently by a plug 19. The invention makes it possible to bleed the actuting bellows of the bottom outlet valve of a tank externally of the tank or chamber. Since the vent 18, as well as the operating line 15, is connected with the detachable bottom plate 7 the entire operating device can be removed from and applied to the external outlet body 2 by simply attaching and detaching this plate.

It will be understood that the invention is not limited to the precise form illustrated.

I claim:

A hydraulically operated tank valve comprising the combination of an external body applied to an outlet from the tank, a spring-seated valve member normally closing the entrance to said body, a detachable plate closing the bottom of said body, a casing carried by said plate inside the body, a tubular metal bellows inside said casing and secured thereto at the upper end, a head secured to the lower end of said bellows, a thrust member connected with said head for unseating said valve member, said plate having two openings through it, an operating line connected to one of said openings, a closure for the other of said openings, and a vent tube extending upward from the latter opening to the top of the space between said bellows and said casing.

AUGUSTINE DAVIS, Jr